US012694736B2

(12) United States Patent
Chan et al.

(10) Patent No.: US 12,694,736 B2
(45) Date of Patent: Jul. 28, 2026

(54) METHOD FOR SECURING AN ACCESS TO A LOCATION USING A GATE SYSTEM AND AN OVERHEAD SENSOR

(71) Applicant: IDEMIA IDENTITY & SECURITY FRANCE, Courbevoie (FR)

(72) Inventors: Samuel Chung-Chuen Chan, Courbevoie (FR); Neil Scott Graham, Courbevoie (FR); Steven James Bennett, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 48 days.

(21) Appl. No.: 18/626,508

(22) Filed: Apr. 4, 2024

(65) Prior Publication Data

US 2024/0338983 A1 Oct. 10, 2024

(30) Foreign Application Priority Data

Apr. 7, 2023 (FR) ..................................... 23 03486

(51) Int. Cl.
*G07C 9/10* (2020.01)
*G07C 9/00* (2020.01)
(Continued)

(52) U.S. Cl.
CPC ........... *G07C 9/00563* (2013.01); *G07C 9/25* (2020.01); *G08B 21/22* (2013.01)

(58) Field of Classification Search
CPC ...... G07C 9/00563; G07C 9/10; G07C 9/257; G07C 9/26; G07C 9/25; G07C 9/37;
(Continued)

(56) References Cited

U.S. PATENT DOCUMENTS 10,249,158 B1 * 4/2019 Jordan, II ............. H04W 4/024
2004/0262383 A1 * 12/2004 Zielinski .................. G07C 9/30 235/382

(Continued)

FOREIGN PATENT DOCUMENTS

AU 2012 257 871 A1 11/2013
EP 3 611 659 A1 2/2020

OTHER PUBLICATIONS

Preliminary French Search Report issued Dec. 13, 2023 in French Application 23 03486 filed on Apr. 7, 2023, citing documents 1 & 15-16 therein, 10 pages.

*Primary Examiner* — Dionne Pendleton
(74) *Attorney, Agent, or Firm* — Oblon, McClelland, Maier & Neustadt, L.L.P.

(57) ABSTRACT

A method for securing an access to a location using a gate system including an entrance door and an exit door that opens onto the location, comprising:

- obtaining a number of persons who will form a group to pass through the gate system together,
- opening the entrance door,
- counting the number of persons present between the entrance door and the exit door using an overhead sensor,
- verifying, using biometric data, that all the persons present between the entrance door and the exit door are authorized, and
- triggering opening the exit door if the counted number of persons and the obtained number of persons are equal and if all the persons present in the gate system are authorized.

12 Claims, 5 Drawing Sheets

(51) Int. Cl.
*G07C 9/25* (2020.01)
*G08B 21/22* (2006.01)

(58) Field of Classification Search
CPC ........ G07C 9/28; G07C 9/00571; G07C 9/27; G07C 2209/63; G07C 9/00174; G07C 9/00309; G07C 9/253; G07C 2009/00769; G07C 9/00944; G07C 9/15; G07C 9/20; G07C 9/21; G07C 9/22; G07C 9/24; G07C 9/32; G07C 2009/00825; G07C 2209/02; G07C 2209/08; G07C 9/00; G07C 9/00817; G07C 9/00896; G07C 9/29; G07C 2009/00476; G07C 2009/00587; G07C 2009/00865; G07C 2009/0088; G07C 9/00857; G07C 2009/00634; G07C 2209/14; G07C 9/0069; G07C 9/00904; G07C 9/23; G06F 21/32; G06F 21/34; G06F 21/45; G06F 21/6218; G06F 1/163; G06F 21/35; G06F 21/83; G06F 2221/2153; G06F 3/013; G06F 18/00; G06F 21/31; G06F 21/6245; G06F 2221/2131; G06F 3/0488; G06F 21/60; G06F 21/602; G06F 21/604; G06F 21/64; G06F 2221/2141; G06F 3/14; G06F 21/554; G06F 2221/2113; G06F 2221/2137; E05G 5/003; E05G 5/02; G06V 40/10; G06V 40/166; G06V 40/18; G06V 20/52; G06V 40/103; G06V 40/12; G06V 40/1365; G06V 40/172; G06V 40/197; G06V 10/993; G06V 40/50; G06V 40/171; H04W 12/06; H04W 12/33; H04W 88/02; H04W 12/04; H04W 12/065; H04W 12/08; H04W 12/40; H04W 12/63; H04W 12/64; H04W 12/68; H04W 4/80; H04W 12/02; H04W 12/50; H04W 12/69; E05Y 2900/132; E05Y 2900/116; E05Y 2400/66; H04L 63/0861; H04L 63/083; H04L 9/3231; H04L 2209/805; H04L 2463/121; H04L 63/0428; H04L 63/062; H04L 63/0853; H04L 63/0876; H04L 63/108; H04L 9/3226; H04L 9/3234; H04L 63/00; H04L 9/0866; H04L 63/0492; H04L 2209/046; H04L 63/0442; H04L 63/0457; H04L 63/0807; H04L 63/10; H04L 63/126; H04L 67/12; H04L 9/008; G06Q 20/40145; G06Q 20/3278; G06Q 20/346; G06Q 20/341; G06Q 20/382; G06Q 20/3415; G06Q 30/0635; G06Q 30/0645; G08B 25/016; G08B 7/066; G08B 13/14; G08B 3/10; G08B 5/36; G08B 13/19613; G08B 25/10; H04B 1/385; H04B 17/318; B60R 25/04; B60R 25/22; B60R 25/24; B60R 25/25; B60R 25/252; B60R 25/255; B60R 25/257; B60R 2325/105; B60R 2325/205; B60R 25/102; B60R 25/245; G01S 5/0252; G01S 7/4913; G01S 3/00; E05B 1/00; E05B 2047/0067; E05B 2047/0065; E05B 37/00; E05B 47/00; E05B 49/00; E05B 55/005; E05B 63/18; E05B 65/1046; E05B 65/1053; E05B 65/1093; G06K 7/10297; G06K 19/0718; G06K 19/07703; G06K 7/0013; G06K 7/1404; G06K 7/1447; E06B 3/903; B64D 45/0031; Y10T 70/5199; Y10T 70/7062; Y10T 70/7068; A61M 1/14; A61M 2205/3553; A61M 2205/3576; A61M 2205/3592; A61M 2205/6063; B64U 2101/31; B64U 2201/20; B64U 80/40; E05C 3/042; H04N 13/282; H04N 23/661; G16H 10/60; G16H 20/40; G16H 40/20; G16H 40/67; G08C 17/02; G07F 7/1008

See application file for complete search history.

(56) References Cited

U.S. PATENT DOCUMENTS

| | | | | |
|---|---|---|---|---|
| 2007/0189585 | A1* | 8/2007 | Sukegawa ................ | G07C 9/37 382/118 |
| 2013/0242074 | A1* | 9/2013 | Sekiguchi ............ | G06V 40/103 348/77 |
| 2020/0202470 | A1* | 6/2020 | Graham ................. | G16H 40/67 |
| 2021/0355699 | A1* | 11/2021 | Righetto ................... | A61L 2/18 |
| 2022/0237970 | A1 | 7/2022 | Hirasawa et al. | |

* cited by examiner

[Fig. 1]
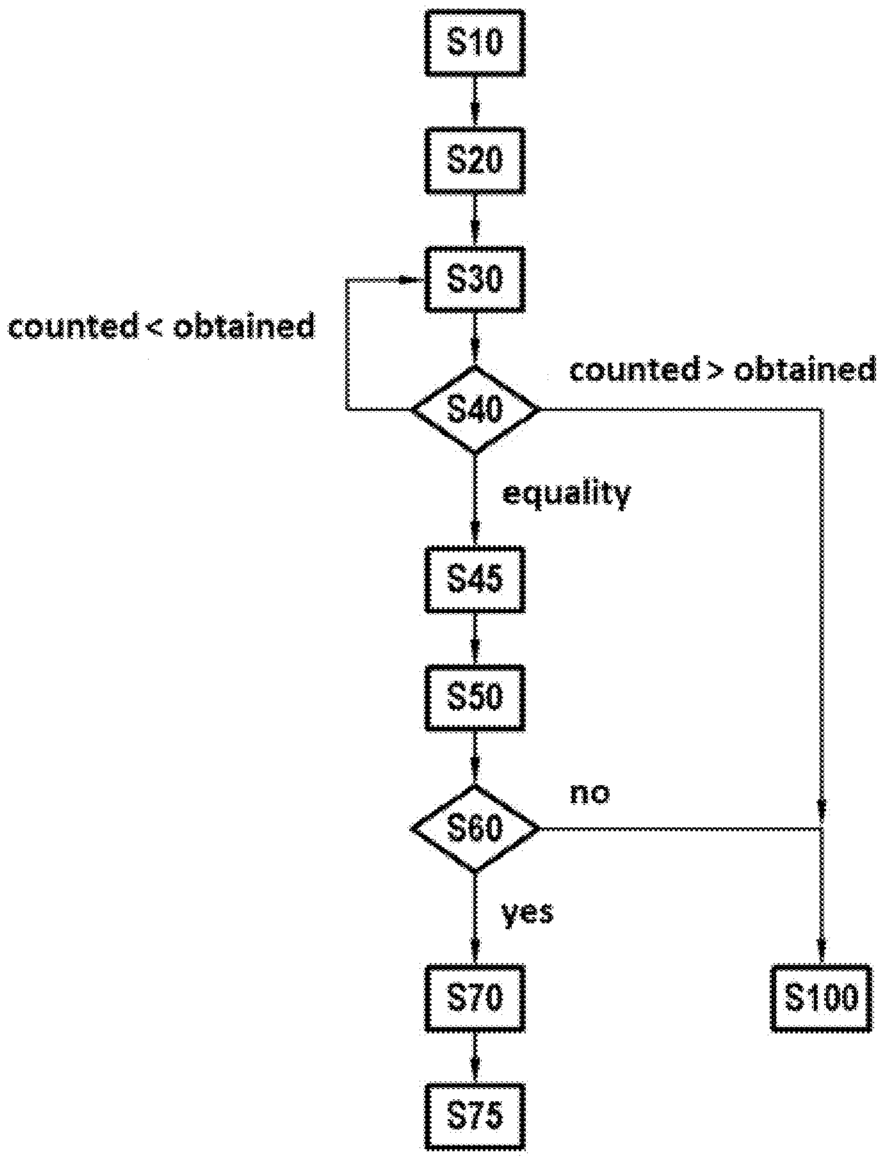

[Fig. 2A]
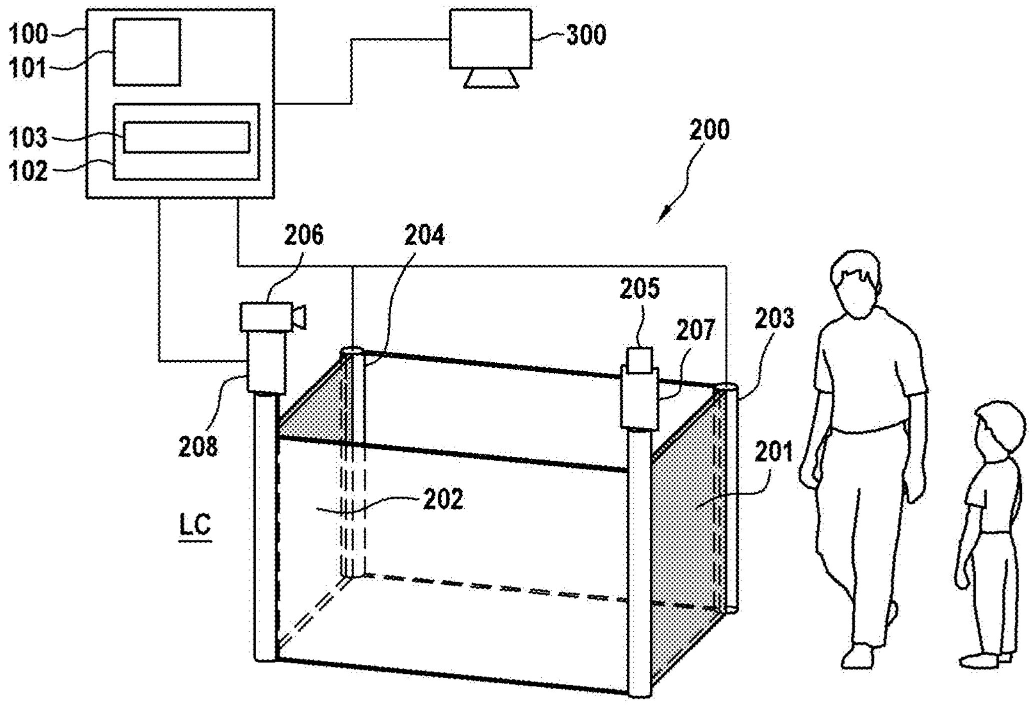
[Fig. 2B]
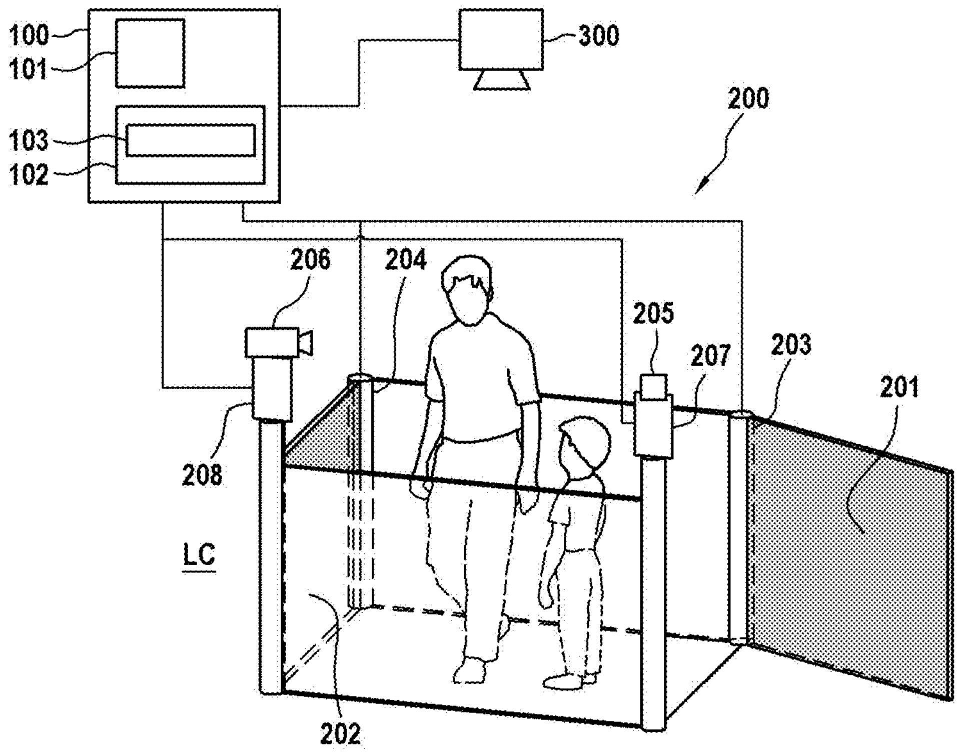

[Fig. 2C]
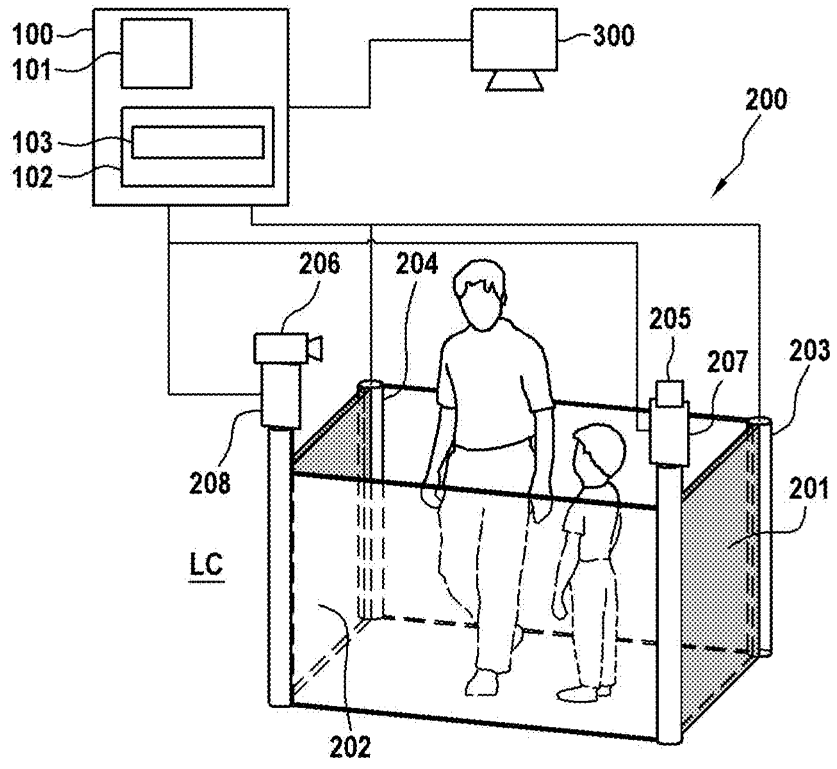
[Fig. 2D]
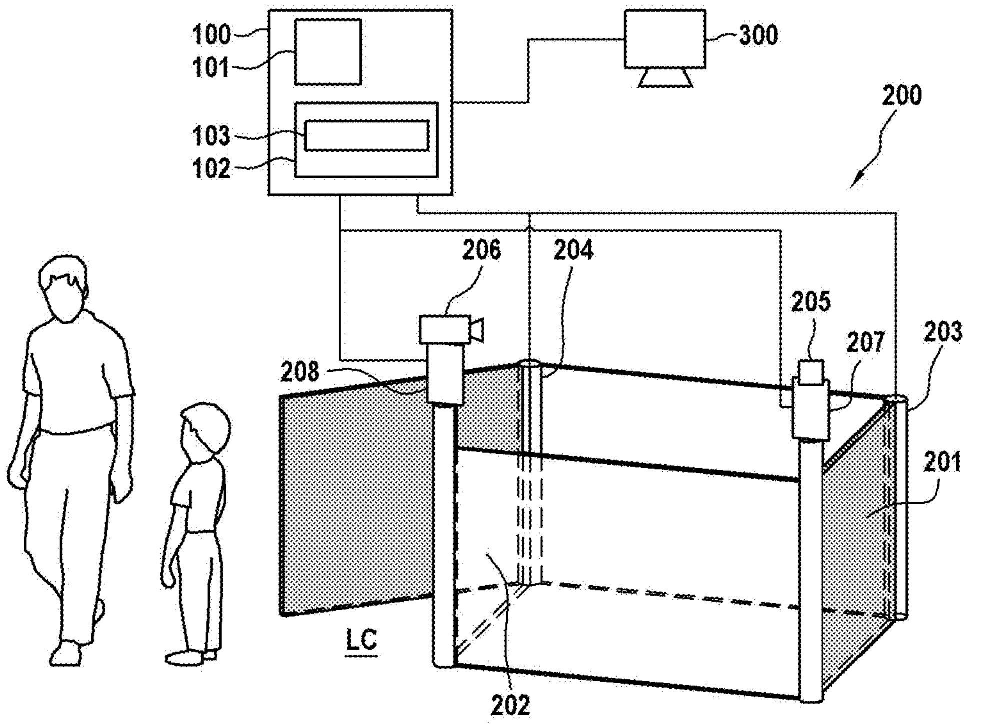

[Fig. 3A]
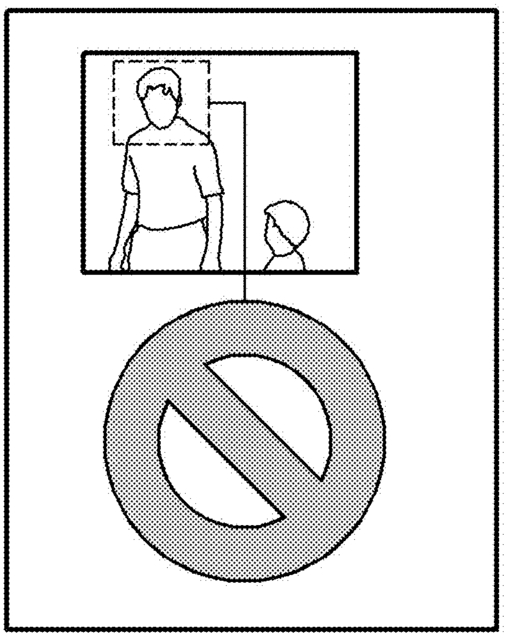
[Fig. 3B]
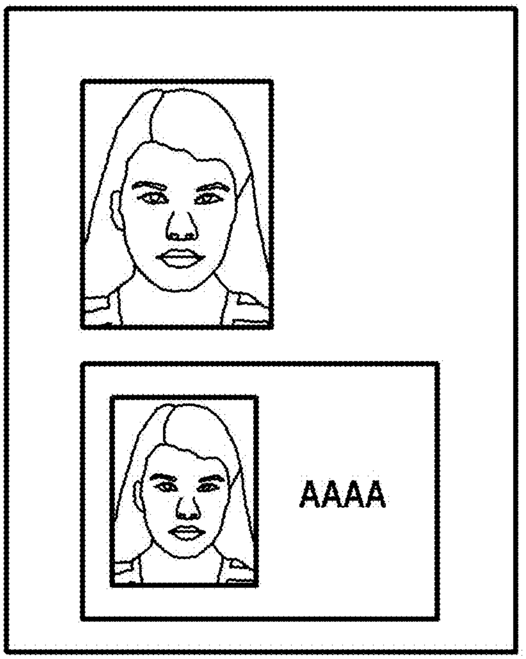

[Fig. 3C]
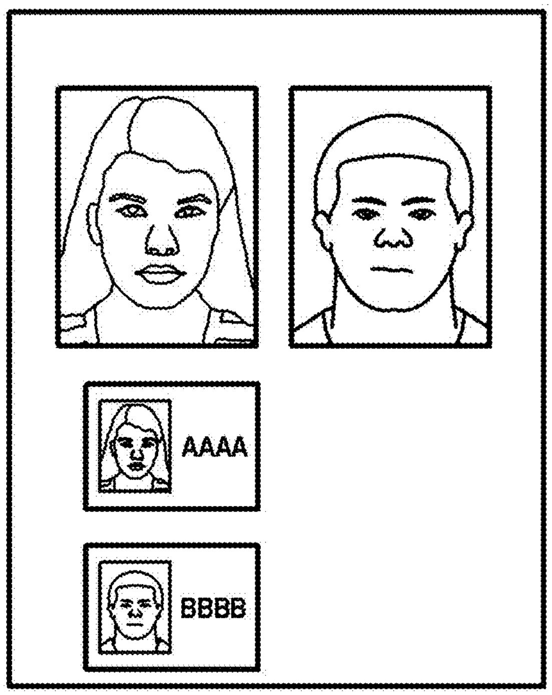
[Fig. 3D]
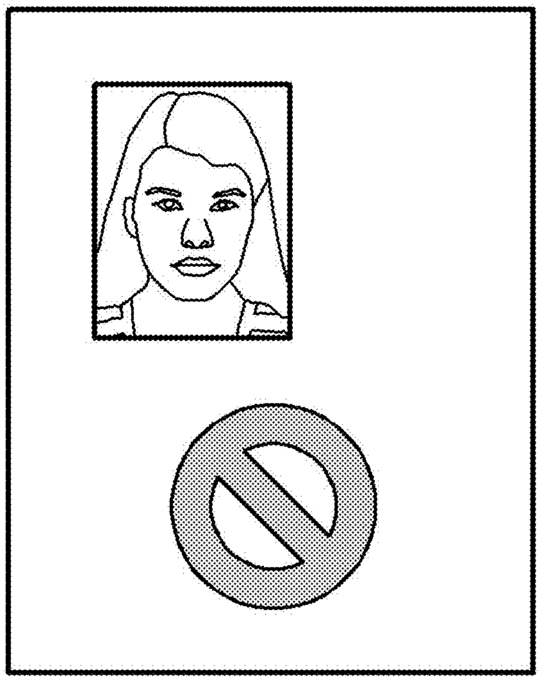

METHOD FOR SECURING AN ACCESS TO A LOCATION USING A GATE SYSTEM AND AN OVERHEAD SENSOR

FIELD

The invention relates generally to the field of securing an access to a location using a gate system. The invention applies in particular to securing a border, typically an access to a plane or a building.

BACKGROUND

Airports now provide border clearance solutions called automated border control systems. These systems allow a user to scan his/her passport at the entrance of the system so as to enter the system and so that a biometric check can be performed to verify that the person present in the system is, for example, the person associated with the scanned passport. The passport may also be scanned prior to the user approaching the gate system.

Typically, facial recognition techniques are used to assess that the person is authorized to pass through the automated border control system. A camera can therefore be used to acquire images of the face of a person present within the system.

These systems are usually limited to processing a single person at a time. This is problematic as multiple people may prefer being processed together. For example, a person using a wheelchair and an accompanying person may have to go together through the system. Also, a family may prefer being processed together.

There exist systems that can process multiple persons within a same gate system. These systems usually use a camera that performs facial recognition on a group of persons on the images acquired by the camera.

The known systems present a drawback, a person tailgating behind an authorized person may remain hidden. This results from the use of point-to-point infrared systems in current border clearance gate solutions (in a manner which is analogous to sliding doors infrared detectors). These systems have a limited field of view which fails in the prevention of tailgating events. This poses a security issue as unauthorised people can cross a border due to the tailgating weakness.

There remains a need for a solution that allows multiple persons to be processed together in a gate system without the above mentioned drawbacks.

BRIEF SUMMARY

Systems and methods for securing an access to a location are disclosed.

The disclosure provides a method for securing an access to a location using a gate system including an entrance door and an exit door that opens onto the location, comprising:

- obtaining a number of persons who will form a group to pass through the gate system together and respective biometric information (the number is the expected number of persons that will be processed together, and the respective biometric information is for example obtained by scanning each person's physical or digital credential/passport),
- opening the entrance door (for example after the step of obtaining a number of persons who will form a group),
- counting the number of persons present between the entrance door and the exit door using an overhead sensor,
- verifying if the counted number of persons and the obtained number of persons are equal,
- acquiring biometric information of the persons present between the entrance door and the exit door;
- verifying, using the acquired biometric information and the obtained biometric information, that all the persons present between the entrance door and the exit door are biometrically authorized, and
- triggering opening the exit door if the counted number of persons and the obtained number of persons are equal and if all the persons present in the gate system are biometrically authorized (consequently, the number of persons authorized is also equal to the obtained number of persons).

For example, the exit door can remain shut if the counted number of persons and the obtained number of persons are not equal and/or if not all the persons present in the gate system are authorized.

Thus, the above method proposes using an overhead sensor to count to number of persons that are present to ensure that the correct number of persons are being processed together (they pass the gate system together). Consequently, an event in which someone tailgates behind a person that cannot be detected by the biometric sensor used to verify that the persons are authorized (typically a camera if the biometric data is facial data), and in which the exit door opens, is prevented. This improves the security of the access to the location.

The gate system may be configured so that it can only be entered through the entrance door and so that only authorised persons can leave through the exit door, for example, the gate system may form a corridor extending between the entrance door and the exit door. Typically, unauthorised persons are not permitted to leave via the exit door and are required to reverse their passage and leave via the entrance door.

The person skilled in the art will be able to select a suitable overhead sensor, able to acquire data on which a processing can be performed to count a number of persons. In particular, the overhead sensor differs from the point-to-point infrared sensor in that these sensors are not able to count a number of persons in an entire zone comprised between the doors.

Also, by biometrically authorized, what is meant is that the biometric information acquired for persons present in the gate system using a biometric sensor (for example a camera), and the obtained biometric information match. If the result of the matching is positive for a person, this person is biometrically authorized.

According to a particular embodiment, following the opening of the exit door, the exit door is shut when the counted number of persons is equal to zero.

This particular embodiment ensures that the persons that were present have exited the gate system.

According to a particular embodiment, if the counted number of persons and the obtained number of persons are equal, the entrance door is shut.

This particular embodiment ensures that no further person enters the gate system if the expected number of persons for the current group has been reached.

According to a particular embodiment, an alarm signal is generated if the counted number of persons is greater than the obtained number of persons.

This particular embodiment ensures that when a tailgating situation is probable, the entrance door will remain open with system instructions and alarms activated until the discrepancy is resolved.

In this embodiment, there are more persons within the gate system than what is expected, and an alarm signal is generated. This alarm signal may then be perceived visually, for example on a display, or it can be heard if it is an audio signal. The alarm signal can indicate to the tailgater(s) that they have to leave the gate system through the entrance door.

According to a particular embodiment, counting the number of persons present in the gate system using the overhead sensor is performed repeatedly.

For example, counting can be performed at a given frequency.

For example, it can be performed continuously.

For security reasons, notably to avoid people swapping, the step of verifying is preferably performed after it has been checked that the counted number of persons and the obtained number of persons are equal and the entrance door shut.

The counted number can be repeatedly compared to the obtained number (for example this can be performed for every new counting performed).

According to a particular embodiment, the acquired biometric information and the obtained biometric information comprise facial data or iris data or fingerprint data.

In particular, facial data or iris data are preferred as these solutions may be easier to implement for young children passing through the gate system.

According to a particular embodiment, the acquired biometric information and the obtained biometric information comprise facial data, and wherein the method comprises determining the position of the faces of the persons counted as present between the entrance door and the exit door using the overhead sensor.

This embodiment may further comprise converting the position of the faces of the persons counted as present in the gate system from a referential associated with the overhead sensor to a referential associated with a biometric sensor used to acquire facial data (typically a camera).

This particular embodiment allows using the position determined using the overhead sensor to facilitate acquiring the facial data (as the position of the face of the persons is known).

This particular embodiment also allows tracking persons observed with the overhead sensor and more precisely tracking authorized persons (for example if determining the position is performed repeatedly).

According to a particular embodiment, the overhead sensor is a time-of-flight sensor or the overhead sensor includes a stereoscopic arrangement of cameras.

The inventors of the present invention have observed that using a time-of-flight sensor is particularly advantageous in terms of processing time and cost: a time-of-flight sensor has been observed to be particularly efficient to count a number of persons present in a scene observed from the top.

A stereoscopic arrangement of cameras can be used to produce 3D image which can be processed to count a number of persons.

According to a particular embodiment, the method comprises a preliminary step of verifying at least one physical credential and, if the at least one physical credential corresponds to a person that is part of the group, triggering opening the entrance door.

For example, in this particular embodiment, a pre-enrolment, for example online or at a physically separate self-service kiosk, may have been performed in which the group has been defined and all the credentials of all the persons in the group have been obtained. If the at least one physical corresponds to a person that is part of the group it allows identifying the group (if there are multiple possible groups) and obtaining the number of persons.

According to a particular embodiment, the preliminary step of verifying comprises verifying a plurality of physical credentials, and, if the physical credentials of the plurality of physical credentials are each associated with persons who will form the group, triggering opening the entrance door.

In this particular embodiment, a number of physical credentials equal to the number of persons who will form a group are verified.

The disclosure also provides a device for securing an access to a location using a gate system including an entrance door and an exit door that opens onto the location, comprising:

- a module for obtaining a number of persons who will form a group to pass through the gate system together and respective biometric information,
- a module for opening the entrance door,
- a module for counting the number of persons present between the entrance door and the exit door using an overhead sensor,
- a module for acquiring biometric information of the persons present between the entrance door and the exit door
- a module for verifying, using the acquired biometric information and the obtained biometric information, that all the persons present between the entrance door and the exit door are biometrically authorized, and
- a module for triggering opening the exit door if the counted number of persons and the obtained number of persons are equal and if all the persons present in the gate system are biometrically authorized.

This device can be configured to perform any one of the above defined embodiments.

The disclosure also provides a system comprising the device as defined above, the overhead sensor, and a biometric acquisition module (for example configured to be used in to acquire the biometric data used to verify that all the persons present are authorized).

The disclosure also provides an installation comprising the system as defined above and the gate system.

In other words, the installation comprises the entrance door and the exit door.

This installation can be set in an airport, for example in a border clearance area.

This installation may also be set at the entrance of a building. The disclosure is not limited to these two examples and can be applied to various locations that need a secure access.

BRIEF DESCRIPTION OF THE DRAWINGS

The accompanying drawings, which are incorporated herein and form a part of the specification, illustrate the present disclosure and, together with the description, further serve to explain the principles of the disclosure and to enable a person skilled in the pertinent art to make and use the disclosure.

FIG. 1 illustrates schematically the steps of a method for securing an access to a location.

FIGS. 2A, 2B, 2C, and 2D show an installation according to an example, at various stages.

FIGS. 3A, 3B, 3C, and 3D show the contents of a screen according to an example.

DETAILED DESCRIPTION OF EMBODIMENTS

We will now describe methods and systems for securing an access to a location, configured to allow multiple persons that should be processed together to pass together through a gate system. These persons form a group, and can be registered as such in a database.

By way of example and in a non-limiting manner, a preferred method can be resumed as

- obtaining a number of persons who will form a group to pass through the gate system together and their respective biometric information thanks to identity credential capture before entrance, for example using a scanner at the entrance of the gate system for the user to scan credentials of the persons of the group,
- opening the entrance door, allowing the group to enter the gate, if the respective identity credentials are eligible (the credential is eligible to use an Automated Border eGate, this check of eligibility can be performed internally by the eGate implementing the local rules or the eligibility question addressed to the border agency servers (based on their advanced passenger information/passenger name record) for example),
- counting the number of persons present between the entrance door and the exit door of the gate using an overhead sensor,
- verifying if the counted number of persons and the obtained number of persons are equal, and if equals, close entrance doors, and;
- launching biometric capture to acquire live biometric information of the persons present between the entrance door and the exit door,
- verifying, using the acquired biometric information and the obtained biometric information, that all the persons present between the entrance door and the exit door are biometrically authorized, (preferably keeping counting to detect any change) and;
- triggering opening the exit door if the counted number of persons and the obtained number of persons are equal and if all the persons present in the gate system are biometrically authorized,
- counting until occupancy equals zero;
- closing exit doors when occupancy equals zero.

In the previous paragraph, by eligible to use an Automated Border eGate, what is meant is that some countries may have rules about who can use automated border systems. Typically, only passports from a given list of countries may be allowed in a given country to use automated border system.

The gate systems described hereinafter include an entrance door and an exit door.

The gate systems described hereinafter can be part of an installation arranged in an airport, for example in a border clearance area. The disclosure is not limited to a border area and applies to securing other types of locations.

On FIG. 1, the steps of a method according to an example have been represented.

This method can be performed by a device such as a computer system, as will be shown in reference to FIG. 2A. Also, this method can be implemented in a zone including a gate system including an entrance door and an exit door that are controllable (i.e. controllable by the device).

In a first step S10, a number of persons to be processed together is obtained. This number can be received, for example though a communication network. Alternatively, this number can be entered in a human machine interface located on the side of the entrance door.

Also, in step S10, respective biometric information is obtained for the persons who will form a group, for example from identity credentials (digital or physical, such as passport, RFID badges . . . ).

Persons to be processed together form a group. By way of example, a group can include members of a same family, a person using a wheelchair and an accompanying person, etc. When a group is formed, information relating to the group is stored: a list of persons in the group can be stored in a database.

The number of persons to be processed together can be deduced from a step in which a number of identification documents (typically passports) are processed together, the number of identification documents being the number to be obtained in step S10. The number of persons can be obtained upon touching a termination button on a screen at the entrance of the gate system, once all the persons of the group have had their credentials scanned, the user(s) thus confirming that all the relevant credentials were scanned for the complete group, or alternatively, the number of persons can be entered on the system at the entrance gate, on a displayed keyboard for example, preferably before starting the scan of the credentials.

Alternatively, a pre-enrolment step may have been performed to define the group, and at step S10 the obtention of the number of persons and their credential can be based on the scan of the credential of only one person of the group, all the credentials of the persons of the group having been "attached/associated" together at a pre enrolment step, and being retrieved automatically when processing the scanned credential.

Following step S10, step S20 can be obtained in which the entrance door is opened (or for example opening the entrance door is triggered). Opening the entrance door can be triggered by a step of verifying eligibility of one or more physical credentials. For example, all the credentials of all the persons in a group can be processed before the entrance door is opened, opening being triggered if all credentials are eligible (i.e. eligible to pass through the gate system).

The processing can be implemented through a human-machine interface at the entrance door that processes credentials (e.g. passport or other identification credential).

Alternatively, when the group is pre-defined (pre-enrolment step) only one credential can be processed and at step S10, it is checked that the credential is eligible and corresponds to a person that is part of the group before the entrance door is opened.

Step S20 can be performed simultaneously with step S10 if the number of persons in the group is only obtained once a credential is processed.

Once the entrance door has been opened, the number of persons present between the entrance door and the exit door is counted using an overhead sensor (step S30).

By way of example, the overhead sensor can comprise a time-of-flight sensor.

This time-of-flight sensor can be the one manufactured by Austrian company BECOM GROUP under the commercial name "Sentis3D-M421". This sensor is equipped with a module able to count the number of persons visible in the field of view of the sensor.

In step S40, it is verified if the counted number of persons present and the obtained number of persons are equal.

If they are equal, a step S45 can then be performed in which 4 the entrance door is shut (or for example shutting the entrance door is triggered).

Also, if the counted number of persons is greater than the obtained number of persons, an alarm signal can be generated in step S100. This alarm signal can be an audio signal, a visual signal, etc.

If the counted number of persons is smaller than the obtained number of persons, step S30 can be repeated (for example it is performed continuously).

In step S50, biometric information of the persons present between the entrance door and the exit door is obtained. This can be performed with a distinct biometric sensor. For example, if facial data is used, the biometric sensor can be a camera.

In step S60, it is verified, using the acquired biometric information and the obtained biometric information, that all the persons present between the entrance door and the exit door are biometrically authorized. This can be performed using software that matches the obtained biometric information with the acquired biometric information. The obtained biometric information can be obtained in a pre-enrolment process in which credentials (for example passports) were processed to obtain biometric information.

If there is an unauthorized person, step S100 can be performed.

If the result of this verification is positive (i.e. if the counted number of persons and the obtained number of persons are equal and if all the persons present in the gate system are biometrically authorized), then step S70 is carried out in which the opening the exit door is triggered.

By way of example, it is possible to shut the exit door in an optional step S75, in which following the opening of the exit door, the exit door is shut when the counted number of persons is equal to zero (or for example closing the exit door is triggered). This embodiment implies that the number of persons present between the entrance door and the exit door is counted repeatedly, for example continuously.

It should be noted that if step S70 cannot occur (for example after a given duration has expired), which could be the case for a parent carrying an infant that cannot be detected by the overhead sensor, this can raise an alarm, for example in a device of an operator, so that a counting can be performed by a human. The alarm may also be analogous to the alarm of step S100.

The steps of the method for securing an access to a location described in the present disclosure can be performed by a computer system configured to control the gate system (the two doors), the overhead sensor, and at least a biometric acquisition module.

This is visible on FIG. 2A on which an installation including a device 100 having the structure of a computer system has been represented. On this figure, the installation comprises a gate system 200 represented along an overhead sensor 300, arranged to be above the gate system 200. The gate system 200 and the device are configured to secure an access to location LC, on the left side of the gate system on the figure.

It should be noted that device 100, the overhead sensor 300 and the camera 206 form a system that can be implemented on various gate systems.

Location LC can be a boarding area for an airplane or a Customs border clearance processing area.

Device 100 comprises a processor 101 and a non-volatile memory 102 including computer program instructions 103, that, when executed by processor 101, cause the device to perform the method described in reference to FIG. 1.

Further, the computer program instructions 103, when executed by processor 101, form at least the following modules:

- a module for obtaining a number of persons who will form a group to pass through the gate system together,
- a module for opening the entrance door,
- a module for counting the number of persons present between the entrance door and the exit door using an overhead sensor,
- a module for verifying, using biometric data, that all the persons present between the entrance door and the exit door are authorized, and
- a module for triggering opening the exit door if the counted number of persons and the obtained number of persons are equal and if all the persons present in the gate system are authorized.

The gate system comprises an entrance door 201 (typically a glass door/gate) shown in its shut position, and which can be opened using a motorized hinge 203 (other mechanisms can be used such as sliding doors, etc.), and an exit door 202 having the same structure as entrance door 201 and equipped with a motorized hinge 204. The two motorized hinges can be actioned by device 100, which is in communication with these hinges (represented by a line on the figure). This communication can be a wired or a wireless communication.

To enter the gate systems, the two persons (or one of the two persons in case of pre-enrolment step) can present physical credentials to the human-machine interface 205 to verify these credentials.

In order to determine what persons are expected to be found in the gate, prior to opening the entrance door (step S20), a human-machine interface 205 has been arranged in the gate system. Human-machine interface 205 obtains the credentials of those about to enter the gate and could take the form of a passport scanner, barcode scanner for airline boarding passes and/or RFID scanner for identification tags. For example, all the physical credentials of persons that form a group can be processed. Alternatively, one physical credential associated with a person part of a group can lead to determining the group this person belongs to and this leads to obtaining the number of persons.

At the level of exit door 202, a camera 206 has been arranged with a field of view directed to the inside of the gate system (between the entrance door and the exit door). Camera 206 can acquire biometric information of persons present in the gate system.

Human-Machine interface 205 is mounted on a module 207 having a display and which facilitates obtaining credentials for persons who intend on entering the gate. This module 207 may include a display to provide indications to persons regarding how to facilitate acquisition of biometric data and to show alarm signals if required.

Camera 206 is mounted on a module 208 also having a display. For example, camera 206 and its respective module 208 can be a system such as the one commercialised by French Company IDEMIA under the commercial name MFACE.

The module 208 can implement the verification of authorizations based on facial data acquired by the camera, in a manner known in itself. Also, the module 208 is in communication with the device 100. This communication can be a wired or a wireless communication.

In order to perform the above described method, the time-of-flight sensor 300 is also in communication with the device 100. This communication can be a wired or a wireless communication.

On the figure, two persons forming a group have been represented on the side of the entrance door, prior to entering the gate system.

FIG. 2B shows the two persons entering the gate system by passing through the entrance door 201 which has been opened in step S20. Step S30 can be carried out. One of these two persons is taller than the other one, which can lead to camera 206 not detecting the smaller person (for example if this person is hidden behind the taller person).

As explained above, for passing through the gate system, this situation is not problematic as the time-of-flight sensor 300 identifies that there are two persons in the gate enabling device 100 to send instructions to screen 100 for the people to adjust their position into the field of view of camera 206 to allow the biometric verification.

The overhead sensor is advantageous as camera 206 may not always see the smaller person. The entrance door may open towards the inside of the gate system, or, preferably, towards the outside of the gate system (as represented). It should be noted that an entrance door opening towards the outside of the gate system, as shown on the figure, facilitates entering the gate system for a person in a wheelchair or for a group. Also, an entrance door opening towards the inside of the gate system may facilitate a single traveller entering the gate system.

By way of example, the overhead sensor can determine the position of the faces of the persons counted as present between the entrance door and the exit door.

The method may further comprise converting the position of the faces of the persons counted as present in the gate system from a referential associated with the overhead sensor to a referential associated with camera 206.

This allows using the position determined using the overhead sensor to facilitate acquiring the facial data (as the position of the face of the persons is known).

This also allows tracking persons observed with the overhead person and more precisely tracking authorized persons (for example if determining the position is performed repeatedly, for example every time step S30 is performed).

For example, the overhead sensor can deliver a unique identifier for every person counted, and this identifier can be used in the tracking, or used in combination with personal information obtained when verifying that users are authorised.

FIG. 2C shows the gate system after step S55 has been performed. Overhead sensor 300 has counted that the group is complete.

FIG. 2D shows the gate system after step S70 has been performed. This implies that step S60 has been performed and that all the persons faces matched to the obtained eligible credentials, meaning they were biometrically authorized, as explained above in relation to this step.

As shown on the figure, the exit door opens towards the outside of the gate system so as to facilitate exiting the gate system.

On the displays of modules 207 and 208, it is possible to display alarm signals (for example if step S100 is performed).

One example of such an alarm signal is shown on FIG. 3A. This alarm signal may also be delivered on a device of a security operator. By way of example, a video stream obtained by camera 206 may be displayed, as represented on the figure, on an operator's device (portable device or desktop). The operator being for example a security operator or customs official, depending on the application.

As visible on the figure, the face of the person in the right side of the video stream has been deemed biometrically unauthorized.

FIG. 3B shows in an upper section a face observed by a camera and in the lower section pre-obtained biometric data, here an image of a personal document such as a passport. The display can present this when the person shown is authorized.

FIG. 3C shows how two persons forming a group may be processed. Here, the two persons are authorized.

FIG. 3D shows the output of a camera and an alarm signal if this person is not an authorized person.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

The invention claimed is:

1. A method for securing an access to a location using a gate system including an entrance door and an exit door that opens onto the location, comprising:

obtaining a number of persons who will form a group to pass through the gate system together and respective biometric information, opening the entrance door, counting the number of persons present between the entrance door and the exit door using an overhead sensor, verifying if the counted number of persons and the obtained number of persons are equal, acquiring biometric information of the persons present between the entrance door and the exit door, verifying, using the acquired biometric information and the obtained biometric information, that all the persons present between the entrance door and the exit door are biometrically authorized, and triggering opening the exit door if the counted number of persons and the obtained number of persons are equal and if all the persons present in the gate system are biometrically authorized, wherein if the counted number of persons and the obtained number of persons are equal, the entrance door is shut, and following the opening of the exit door, the exit door is shut when the counted number of persons is equal to zero.

2. The method of claim 1, wherein an alarm signal is generated if the counted number of persons is greater than the obtained number of persons.

3. The method of claim 1, wherein counting the number of persons present in the gate system using the overhead sensor is performed repeatedly.

4. The method of claim 1, wherein the acquired biometric information and the obtained biometric information comprise facial data or iris data or fingerprint data.

5. The method of claim 1, wherein the acquired biometric information and the obtained biometric information comprise facial data, and wherein the method comprises determining the position of the faces of the persons counted as present between the entrance door and the exit door using the overhead sensor.

6. The method of claim 1, wherein the overhead sensor is a time-of-flight sensor or the overhead sensor includes a stereoscopic arrangement of cameras.

7. The method of claim 1, comprising a preliminary step of verifying a physical credential and, if the physical credential corresponds to a person that is part of the group, triggering opening the entrance door.

8. The method of claim 7, wherein the preliminary step of verifying comprises verifying a plurality of physical credentials, and, if the physical credentials of the plurality of physical credentials are each associated with persons who will form the group, triggering opening the entrance door.

9. A device for securing an access to a location using a gate system including an entrance door and an exit door that opens onto the location, comprising:

processing circuitry configured to
- obtain a number of persons who will form a group to pass through the gate system together,
- control opening the entrance door,
- count the number of persons present between the entrance door and the exit door using an overhead sensor,
- verify, using the acquired biometric data, that all the persons present between the entrance door and the exit door are authorized, and
- trigger opening the exit door if the counted number of persons and the obtained number of persons are equal and if all the persons present in the gate system are authorized, wherein if the counted number of persons and the obtained number of persons are equal, the processing circuitry is configured to shut the entrance door, and following the opening of the exit door, the processing circuitry is configured to shut the exit door when the counted number of persons is equal to zero.

10. A system comprising the device of claim 9, the overhead sensor, and a biometric sensor.

11. An installation comprising the system of claim 10 and the gate system.

12. A method for securing an access to a location using a gate system including an entrance door and an exit door that opens onto the location, comprising:

- obtaining a number of persons who will form a group to pass through the gate system together and respective biometric information,
- opening the entrance door,
- counting the number of persons present between the entrance door and the exit door using an overhead sensor,
- verifying if the counted number of persons and the obtained number of persons are equal,
- acquiring biometric information of the persons present between the entrance door and the exit door,
- verifying, using the acquired biometric information and the obtained biometric information, that all the persons present between the entrance door and the exit door are biometrically authorized, and
- triggering opening the exit door if the counted number of persons and the obtained number of persons are equal and if all the persons present in the gate system are biometrically authorized,
- wherein if the counted number of persons and the obtained number of persons are equal, the entrance door is shut, and an alarm signal is generated if the counted number of persons is greater than the obtained number of persons.

* * * * *